United States Patent
Cui et al.

(10) Patent No.: US 12,492,431 B2
(45) Date of Patent: Dec. 9, 2025

(54) SEX IDENTIFICATION SPECIFIC DNA SEQUENCE AND SEX IDENTIFICATION METHOD OF CHINESE MITTEN CRAB *Eriocheir sinensis*

(71) Applicant: NINGBO UNIVERSITY, Ningbo (CN)

(72) Inventors: Zhaoxia Cui, Ningbo (CN); Yanan Yang, Ningbo (CN); Tianyi Feng, Ningbo (CN)

(73) Assignee: NINGBO UNIVERSITY, Ningbo (CN)

( * ) Notice: Subject to any disclaimer, the term of this patent is extended or adjusted under 35 U.S.C. 154(b) by 653 days.

(21) Appl. No.: 17/847,210

(22) Filed: Jun. 23, 2022

(65) Prior Publication Data

US 2023/0257810 A1  Aug. 17, 2023

(30) Foreign Application Priority Data

Jan. 24, 2022  (CN) .......................... 202210077326.9

(51) Int. Cl.
*C12Q 1/6879* (2018.01)
*C12Q 1/686* (2018.01)

(52) U.S. Cl.
CPC ........... *C12Q 1/6879* (2013.01); *C12Q 1/686* (2013.01)

(58) Field of Classification Search
None
See application file for complete search history.

(56) References Cited

FOREIGN PATENT DOCUMENTS

| CN | 102994509 A | * | 3/2013 | ......... C12N 15/1096 |
| CN | 109694906 A | * | 4/2019 | ........... C12Q 1/6879 |
| CN | 112251443 A | * | 1/2021 | ......... C12N 15/1096 |

* cited by examiner

*Primary Examiner* — Samuel C Woolwine

(57) ABSTRACT

Disclosed is a sex identification specific DNA sequence and a sex identification method of Chinese mitten crab *Eriocheir sinensis*. The sex identification specific DNA sequence is showed as SEQ ID NO:1. The sex identification method includes following steps: S1, extracting genomic DNA of Chinese mitten crab *Eriocheir sinensis*; S2, PCR amplification using the genomic DNA as template; an upstream primer for PCR amplification is as shown in SEQ ID No: 2 and a downstream primer is as shown in SEQ ID No: 3; S3, examining amplified products by agarose electrophoresis, and those with specific amplified bands are females, otherwise they are males. The method has high identification accuracy, is simple and easy to operate, and is suitable for sex identification of Chinese mitten crab *Eriocheir sinensis* at embryonic and larval stages.

2 Claims, 2 Drawing Sheets

Specification includes a Sequence Listing.

SEQUENCE LISTING

<160> NUMBER OF SEQ ID NOS: 9

<210> SEQ ID NO 1
<211> LENGTH: 647
<212> TYPE: DNA
<213> ORGANISM: Eriocheir sinensis

<400> SEQUENCE: 1

```
cttgtttggc aagcagtgga aaaatatgaa gaaaaggaaa caaccaaaat tatgagtaac      60
ctaaatacaa gatcaatgca aatatcatag acaaaattgc cagcctatac gcaaatgaca     120
caaccacgct gtatctaaat ggagaacctc aagcaaacat aaaagtaaca agtggcaagg     180
atgtaatgga tcaaccatac tgttcacact catcacgtat aagataatcg aagagctgca     240
ggagcaaata caaggtttta gaaacaagaa atttaacata ccagccatat tttatgcaga     300
tgatggacta attctggcca acaatctaga tgatgcaaga aacagtatag taaaactaac     360
aagcattgcg aaaacttgtg gtttggaaat aaataaagcc aaaagcaata tcattatcta     420
caacttaaaa gaccaaccag acattataga aggaataaag gtggagaaaa gtatcaagta     480
actcggggta aagataataa ataccaagaa atactacaaa gaacataaat ccaacagctt     540
acagaaagca agaaagttgc caaatatcac ctactctgaa atagcaaaaa gcagacacag     600
actgttaatt ggaaaaacct actggaatgg cttagcacta cccaaca                  647
```

<210> SEQ ID NO 2
<211> LENGTH: 20
<212> TYPE: DNA
<213> ORGANISM: artificial sequence
<220> FEATURE:
<223> OTHER INFORMATION: the sequence is synthesized

<400> SEQUENCE: 2

```
cttgtttggc aagcagtgga                                                  20
```

<210> SEQ ID NO 3
<211> LENGTH: 21
<212> TYPE: DNA
<213> ORGANISM: artificial sequence
<220> FEATURE:
<223> OTHER INFORMATION: the sequence is synthesized

<400> SEQUENCE: 3

```
tgttgggtag tgctaagcca t                                                21
```

```
<210> SEQ ID NO 4
<211> LENGTH: 20
<212> TYPE: DNA
<213> ORGANISM: artificial sequence
<220> FEATURE:
<223> OTHER INFORMATION: the sequence is synthesized

<400> SEQUENCE: 4
gtcaacggca gcatcacaag                                               20

<210> SEQ ID NO 5
<211> LENGTH: 20
<212> TYPE: DNA
<213> ORGANISM: artificial sequence
<220> FEATURE:
<223> OTHER INFORMATION: the sequence is synthesized

<400> SEQUENCE: 5
ccggcaacac ggaataggaa                                               20

<210> SEQ ID NO 6
<211> LENGTH: 20
<212> TYPE: DNA
<213> ORGANISM: artificial sequence
<220> FEATURE:
<223> OTHER INFORMATION: the sequence is synthesized

<400> SEQUENCE: 6
cgcgtgtgac tcattgtgtg                                               20

<210> SEQ ID NO 7
<211> LENGTH: 20
<212> TYPE: DNA
<213> ORGANISM: artificial sequence
<220> FEATURE:
<223> OTHER INFORMATION: the sequence is synthesized

<400> SEQUENCE: 7
atagtggcgc catcttgcat                                               20

<210> SEQ ID NO 8
<211> LENGTH: 20
<212> TYPE: DNA
<213> ORGANISM: artificial sequence
<220> FEATURE:
<223> OTHER INFORMATION: the sequence is synthesized

<400> SEQUENCE: 8
aggcgtacca cagtttacgg                                               20

<210> SEQ ID NO 9
<211> LENGTH: 20
<212> TYPE: DNA
<213> ORGANISM: artificial sequence
<220> FEATURE:
<223> OTHER INFORMATION: the sequence is synthesized

<400> SEQUENCE: 9
tgggacggaa cagataagcg                                               20
```

SEX IDENTIFICATION SPECIFIC DNA SEQUENCE AND SEX IDENTIFICATION METHOD OF CHINESE MITTEN CRAB *Eriocheir sinensis*

STATEMENT REGARDING SEQUENCE LISTING

The Sequence Listing associated with this application is part of the application and is provided in text in the form of an ASCII text file in lieu of a paper copy, and is hereby incorporated by reference into the specification. The name of the Sequence listing is—SEQUENCE LISTING.txt.—The text file is 2787 bytes in size, was created on Jul. 26, 2022, and is being electronically submitted via EFS-Web.

CROSS REFERENCE TO RELATED APPLICATIONS

This application claims all benefits accruing under 35 U.S.C. § 119 from China Patent Application No. 202210077326.9, filed on Jan. 24, 2022, in the State Intellectual Property Office of China, the disclosure of which is incorporated herein by reference in its entirety.

TECHNICAL FIELD

The disclosure generally relates to the field of sex identification of Chinese mitten crab *Eriocheir sinensis*, and more particularly to a sex identification specific DNA sequence and a sex identification method of Chinese mitten crab *Eriocheir sinensis*.

BACKGROUND

Sexual dimorphism is prevalent in animal morphology and behavior, and as an economic trait in farming economic animals, it affects growth rate and product quality of animals. Nowadays, many aquaculture animals can be single-sexed through sex regulation technology to increase production and improve quality. Chinese mitten crab *Eriocheir sinensis* is a crustacean in aquaculture with great economic value and high yield in China. Chinese mitten crab *Eriocheir sinensis* has obvious sex dimorphism in its growth process. Male crabs are larger in size and grow faster, while female crabs have higher nutritional value. Therefore, research on sex regulation of Chinese mitten crab *Eriocheir sinensis* will have very high economic value in aquaculture industry.

Unlike other species, there is still no clear sex determination mechanism reported in Chinese mitten crab *Eriocheir sinensis*, and it has not even been determined whether it has sex chromosomes. In addition, the difficulty of researching sex regulation mechanism of Chinese mitten crab *Eriocheir sinensis* is that sex cannot be identified by morphology at its embryonic stage and larval stage, but it needs to be identified by sex-specific DNA sequence. In the prior art, no effective sex-specific DNA sequence information and method for obtaining it have been reported. Therefore, there is an urgent need for DNA sequences for rapid sex identification at genome level, which can be used to identify sex of embryonic stage and larval stage of Chinese mitten crab *Eriocheir sinensis*.

SUMMARY OF DISCLOSURE

A purpose of the disclosure is to provide a sex identification specific DNA sequence and a sex identification method of Chinese mitten crab *Eriocheir sinensis*, which can effectively solve the problem above mentioned existing in the prior art.

The technical scheme of the disclosure is:

A sex identification specific DNA sequence of Chinese mitten crab *Eriocheir sinensis*, whose nucleotide sequence is shown in SEQ ID No: 1.

A sex identification method for Chinese mitten crab *Eriocheir sinensis*, which is achieved by identifying the specific DNA sequence described above.

Further, the sex identification method includes the following steps:

S1, extracting the genomic DNA of Chinese mitten crab *Eriocheir sinensis*;

S2, PCR amplification using the genomic DNA as template; the upstream primer for PCR amplification is as shown in SEQ ID No: 2 and the downstream primer is as shown in SEQ ID No: 3;

S3, examining amplified products by agarose electrophoresis, and those with specific amplified bands are females, otherwise they are males.

Further, the program of the PCR amplification is predenaturation at 95° C. for 3 minutes, denaturation at 95° C. for 30 seconds, annealing at 55° C. for 30 seconds, extension at 72° C. for 60 seconds, 30 cycles, incubation at 72° C. for 10 minutes, and storage at 4° C.

A sex identification primer pair for Chinese mitten crab *Eriocheir sinensis* with an upstream primer as shown in SEQ ID No: 2 and a downstream primer as shown in SEQ ID No: 3.

A kit for sex identification of Chinese mitten crab *Eriocheir sinensis*, including the primer pair described above.

Further, the kit includes DNA extraction reagents and PCR reagents.

The technical scheme has following technical effects:

The sex identification method of Chinese mitten crab *Eriocheir sinensis* can be used for sex identification of Chinese mitten crab at embryonic stage and larval stage, the sex identification method is simple and easy to operate with high identification accuracy and stable result. The sex identification method has overcome a major difficulty in early stages sex regulation of Chinese mitten crabs *Eriocheir sinensis*, and laid a solid foundation for subsequent research on sex genes in early developmental stages of Chinese mitten crabs *Eriocheir sinensis*.

The sex identification method only needs a pair of primers, and can obtain clear target bands in 30 cycles, so the operation is simple, more economical, and time-consuming.

DETAILED DESCRIPTION

In order to make clearer the purposes, technical schemes and advantages of the present disclosure, the technical schemes of the present disclosure will be clearly and completely described below with reference to accompanying drawings in embodiments of the present disclosure. Obviously, the described embodiments are some embodiments of the present disclosure, but not all of them. Based on the embodiments of the present disclosure, all other embodiments obtained by those of ordinary skill in the art without creative efforts shall fall within the protection scope of the present disclosure.

Figure 1:
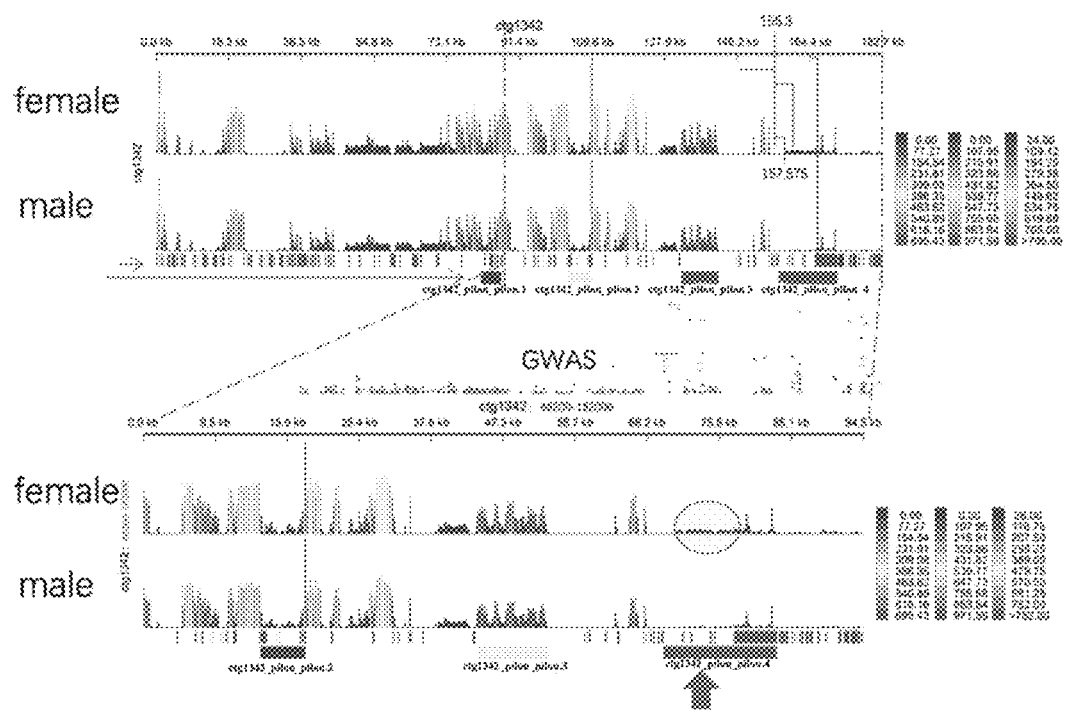
FIG. 1 is a 12,000 bp female-specific and highly expressed sequence diagram provided in an embodiment of the present disclosure.

Re-sequencing analysis was performed on 46 male and 46 female samples of Chinese mitten crabs *Eriocheir sinensis* with three-generation sequencing technology PacBio. In order to obtain representative genomic information, 92 samples were collected from three regions: Taizhou, Dongying, and Panjin. Each sample has an average sequencing depth of 50.33× and generates an amount of data of about 54G. The male sample genome yielded 65,933,379 SNPs and 22,324,002 Indels; the female sample genome yielded 76,978,131 SNPs and 24,552,747 Indels. Genome-wide SNP-sex association analysis (GWAS) was subsequently performed by PLINK analysis software, which show that sex differentiation regions are mainly concentrated in Contig1342 and Contig254, and the sex differentiation regions has a higher deletion rate of male SNPs. This result indicates that the sex differentiation region exists only in females and may be a female-specific region. After in-depth analysis of these two Contigs, it is found that the female-specific region is mainly 88,200-182,000 bp on Contig1342. Through subsequent in-depth analysis, it is found that a continuous female-specific region is at 155,300-164,400 bp in this region. In order to obtain more complete sequence information, a female-specific and highly expressed sequence of about 12,000 bp was obtained after extending 1,500 bp upstream and downstream of the region respectively (FIG. 1). Using BLAST+ software, local blast alignment was performed on the specific genome fragment of the female Chinese mitten crabs *Eriocheir sinensis*, that is the female-specific and highly expressed sequence, and the sequence completely matches. The 12,000 bp female-specific and highly expressed sequence matches the 164555-163909 bp of the female Chinese mitten crabs *Eriocheir sinensis* genome Contig1342 by using BLAST+ software, which is local blast tool.

The nucleotide sequence of the specific genomic fragment is as follows:

```
                                         (SEQ ID NO: 1)
CTTGTTTGGCAAGCAGTGGAAAAATATGAAGAAAAGGAAACAACCAAAA

TTATGAGTAACCTAAATACAAGATCAATGCAAATATCATAGACAAAATT

GCCAGCCTATACGCAAATGACACAACCACGCTGTATCTAAATGGAGAAC

CTCAAGCAAACATAAAAGTAACAAGTGGCAAGGATGTAATGGATCAACC

ATACTGTTCACACTCATCACGTATAAGATAATCGAAGAGCTGCAGGAGC

AAATACAAGGTTTTAGAAACAAGAAATTTAACATACCAGCCATATTTTA

TGCAGATGATGGACTAATTCTGGCCAACAATCTAGATGATGCAAGAAAC

AGTATAGTAAAACTAACAAGCATTGCGAAAACTTGTGGTTTGGAAATAA

ATAAAGCCAAAAGCAATATCATTATCTACAACTTAAAAGACCAACCAGA

CATTATAGAAGGAATAAAGGTGGAGAAAAGTATCAAGTAACTCGGGGTA

AAGATAATAAATACCAAGAAATACTACAAAGAACATAAATCCAACAGCT
```
```
-continued
TACAGAAAGCAAGAAAGTTGCCAAATATCACCTACTCTGAAATAGCAAA

AAGCAGACACAGACTGTTAATTGGAAAAACCTACTGGAATGGCTTAGCA

CTACCCAACA,
```

647 bp totally.

Figure 2:
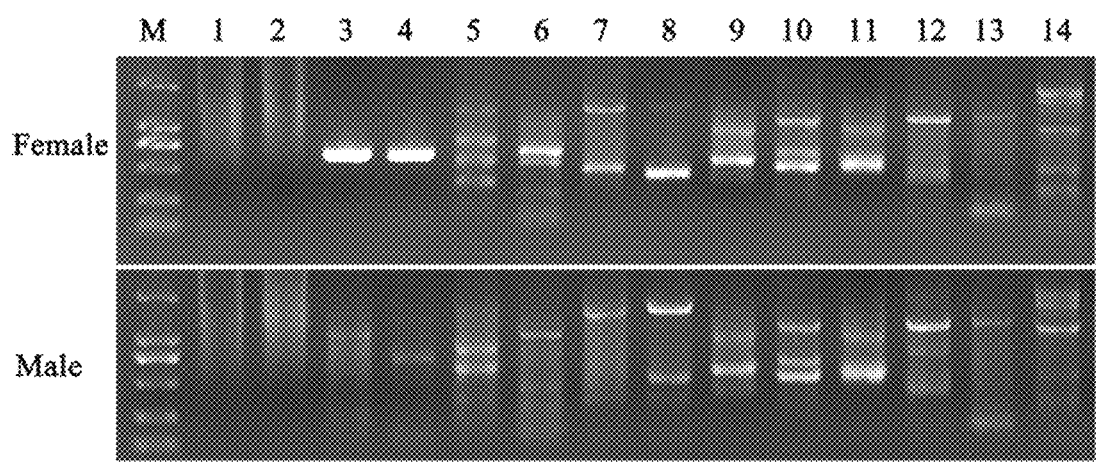
FIG. 2 is a candidate primer screening diagram provided in an embodiment of the present disclosure.
Figure 3:
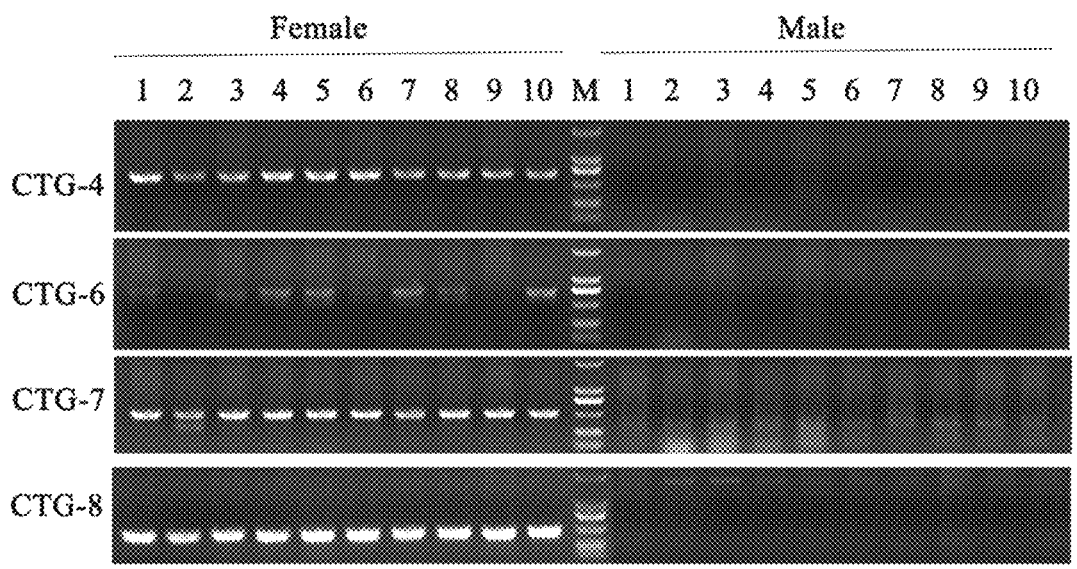
FIG. 3 is a rescreening primer diagram provided in an embodiment of the present disclosure.

For the above sequence, 14 pairs of primers were designed by NCBI Primer, and the specific genomic fragment was PCR amplified by mixing multiple female and multiple male individual gDNA respectively as templates. According to the size of a target bands and the presence or absence of male and female templates, 4 pairs of candidate primers were screened, namely CTG-4, CTG-6, CTG-7, and CTG-8 (FIG. 2). The 4 pairs of primers were screened again, and 10 gDNA of male and 10 gDNA of female individuals were selected as templates. Finally, it was found that only CTG-4 was specifically amplified in females, but not in males (FIG. 3), and other primers were nonspecific amplication in males.

The upstream primer of

```
CTG-4:
                                         (SEQ ID NO: 2)
        CTTGTTTGGCAAGCAGTGGA;
```

The downstream primer of

```
CTG-4:
                                         (SEQ ID NO: 3)
        TGTTGGGTAGTGCTAAGCCAT ;
```

The upstream primer of

```
CTG-6:
                                         (SEQ ID NO: 4)
        GTCAACGGCAGCATCACAAG;
```

The downstream primer of

```
CTG-6:
                                         (SEQ ID NO: 5)
        CCGGCAACACGGAATAGGAA;
```

The upstream primer of

```
CTG-7:
                                         (SEQ ID NO: 6)
        CGCGTGTGACTCATTGTGTG;
```

The downstream primer of

```
CTG-7:
                                         (SEQ ID NO: 7)
        ATAGTGGCGCCATCTTGCAT;
```

The upstream primer of

```
CTG-8:
                                         (SEQ ID NO: 8)
        AGGCGTACCACAGTTTACGG;
```

The downstream primer for

CTG-8:
(SEQ ID NO: 9)
TGGGACGGAACAGATAAGCG.

40 Chinese mitten crabs *Eriocheir sinensis* (samples from Jiangsu) of known sex were randomly selected (20 males and 20 females), and male and female muscle tissue DNA was extracted with a kit (TIANGEN). PCR verification was performed using the muscle tissue DNA as a template.

The 25 μL PCR reaction system is as follows: double distilled water: 17.3 μL; dNTP: 2 μL; 10× Buffer: 2.5 μL; EasyTaq enzyme: 0.2 μL; upstream and downstream primers CTG-4:0.5 μL each; template DNA: 2 μL.

Figure 4:
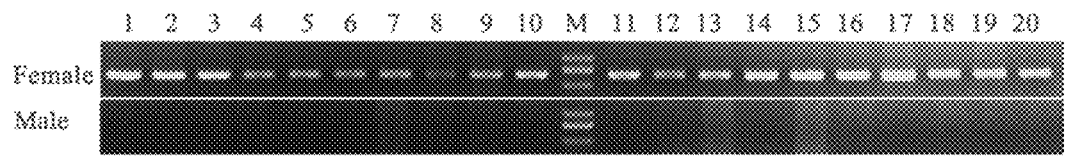
FIG. 4 is a sex identification diagram provided in an embodiment of the present disclosure.

PCR amplification was performed with the amplification program: predenaturation (95° C. for 3 minutes), denaturation (95° C. for 30 seconds), annealing (55° C. for 30 seconds), extension (72° C. for 60 seconds), 30 cycles, and incubation at 72° C., storage at 4° C. for 10 minutes. The amplified products were detected by 1% agarose electrophoresis. The results showed that using this primer, the above-mentioned specific genome fragment (647 bp) was amplified in female individuals, and the female 1-20 had this bands, while the male 1-20 had no specific amplification bands, indicating that this sequence was absent in males (FIG. 4). This method can accurately identify male and female with an accuracy of sex identification 100%.

The above descriptions are only preferred embodiments of the present disclosure, and are not intended to limit the present disclosure. For those skilled in the art, the present disclosure may have various modifications and changes. Any modification, equivalent replacement, improvement, etc. made within the spirit and principle of the present disclosure shall be included within the protection scope of the present disclosure.

What is claimed is:

1. A sex identification method for Chinese mitten crab *Eriocheir sinensis*, wherein the sex identification method is achieved by identifying a specific DNA sequence which is shown in SEQ ID No: 1; the sex identification method comprises following steps:

S1, extracting genomic DNA of Chinese mitten crab *Eriocheir sinensis*;

S2, PCR amplification using the genomic DNA as template; an upstream primer for PCR amplification is as shown in SEQ ID No: 2 and a downstream primer is as shown in SEQ ID No: 3;

S3, examining amplified products by agarose electrophoresis, and those with specific amplified bands are females, otherwise they are males.

2. The sex identification method for Chinese mitten crab *Eriocheir sinensis* according to claim 1, wherein a program of the PCR amplification is predenaturation at 95° C. for 3 minutes, denaturation at 95° C. for 30 seconds, annealing at 55° C. for 30 seconds, extension at 72° C. for 60 seconds, 30 cycles, incubation at 72° C. for 10 minutes, and storage at 4° C.

* * * * *